Patented Mar. 5, 1935

1,993,723

UNITED STATES PATENT OFFICE 1,993,723

CELLULOSE ESTER COMPOSITIONS

Lucas P. Kyrides, Webster Groves, Mo., assignor to Monsanto Chemical Company, St. Louis, Mo., a corporation of Delaware No Drawing. Application May 12, 1934, Serial No. 725,318

2 Claims. (Cl. 106—37)

This invention relates to cellulose ester plastics, such as cellulose acetate, cellulose nitrate and the like, which are to be used as films, threads, coating compositions, molding compositions, etc.

The present invention has as one of its objects the provision of a class of materials as modifying agents for cellulose esters, characterized by the fact that they are compatible with cellulose acetate as well as cellulose nitrate, colorless, odorless, high boiling liquids or low melting solids, having an inordinate light stability as compared to present day plasticizers such as dibutyl phthalate, dimethyl phthalate, tricresyl phosphate and the like.

Tricresyl phosphate and triphenyl phosphate are used extensively in the manufacture of cellulose nitrate and cellulose acetate plastics, respectively. These materials, while quite satisfactory for many purposes, share the disadvantage of discoloration, particularly when exposed to light. I have now found that the cyclohexyl phosphite esters as, for example, tricyclohexyl phosphite and the alkyl substituted homologues, notably tri(methylcyclohexyl) phosphite, as well as mixed alkyl cyclohexyl phosphites, are not only excellent plasticizers for cellulose esters but resist discoloration to an inordinate degree. Thus, whereas a nitrocellulose film which contains tricresyl phosphate as the plasticizer will discolor under test conditions in approximately ten minutes, a similar film in which tricyclohexyl phosphite is employed as the plasticizer shows little or no discoloration even after an hour, when exposed to the same conditions, and the discoloration becomes only slightly perceptible after two hours.

My plasticizers may be made by any suitable method. One convenient method consists in reacting phosphorous trichloride with the alcohol, such as cyclohexanol, methylcyclohexanol, dimethylcyclohexanol, etc. The product is refined by washing with water or a dilute alkaline solution, after which it is distilled under reduced pressure. Mixed alkyl cyclohexyl phosphites, such as methyl, dicyclohexyl phosphite or similar alkyl cyclohexyl phosphites may be made by first forming the alkyl phosphorous dichloride such as methyl phosphorous dichloride

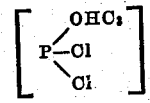

and subsequently reacting cyclohexanol or its homologues by adding the same thereto in excess. The following examples will illustrate embodiments of my invention:

Example I.—Tricyclohexyl phosphite (boiling point 145° C. at 5 mm.) or tri(methylcyclohexyl) phosphite is added to a solution of nitrohexyl cellulose in an amount equivalent to 30% of the weight of the dry cotton. A film obtained therewith, after permitting the solvent to volatilize, will be found to have a flexibility equal to that obtainable with dibutyl phthalate, tricresyl phosphate and the like, and otherwise comparable therewith, but will be found to have a light fastness far superior to that obtainable with present day plasticizers, including the phthalate esters.

Example II.—Cellulose acetate dissolved in a suitable low boiling solvent, such as acetone, is mixed with 30% of its weight of tricyclohexyl phosphite. A colorless, tough, flexible film is obtainable by permitting the low boiling solvent to volatilize.

Example III.—Substitute monomethyldicyclohexyl phosphite for the tricyclohexyl phosphite in Example I.

It is understood that various low boiling solvents may be employed and that my phosphite esters may be mixed with various high boiling solvents, natural or synthetic resins or other modifying agents, including pigments and dyes. It is likewise to be understood that in lieu of a tricyclohexyl ester one may employ the dicyclohexyl cyclohexyl mono-alkyl phosphite esters, the alkyl group being one of the monohydroxy aliphatic alcohols such as methyl, ethyl, butyl and the mono-alkyl ethers of glycols.

What I claim is:

1. A cellulose ester plastic containing a neutral, colorless, odorless phosphite ester of cyclohexanol.

2. The product as defined in claim 1 and further characterized in that the phosphite ester is a tricyclohexyl phosphite.

LUCAS P. KYRIDES.